United States Patent [19]

Barrall et al.

[11] 3,816,237

[45] June 11, 1974

[54] OPTICALLY INACTIVE MAGNETO-OPTIC SUBSTRATE

[75] Inventors: Edward Martin Barrall, San Jose; Kenneth Lee, Saratoga, both of Calif.

[73] Assignee: International Business Machines Corporation, Armonk, N.Y.

[22] Filed: Feb. 26, 1973

[21] Appl. No.: 335,865

[52] U.S. Cl. .... 161/227, 340/173 LS, 340/174 YC, 360/114, 360/131

[51] Int. Cl. .......................................... G11b 11/10

[58] Field of Search.... 340/173 R, 173 LS, 174.1 M

[56] References Cited

UNITED STATES PATENTS 3,521,257 7/1970 Nason ........................ 340/174.1 M 3,626,394 12/1971 Nason ........................ 340/174.1 M

*Primary Examiner*—Terrell W. Fears

[57] ABSTRACT

The use of poly(parabanic acids) as a substrate for magneto-optic data storage applications. For example, the substrate is characterized by having optical inactivity and may be made free of stress induced dichroism and birefringence, thus being particularly suitable for use with magneto-optic storage films where information stored is read by utilizing the Kerr or Faraday effects.

15 Claims, No Drawings

OPTICALLY INACTIVE MAGNETO-OPTIC SUBSTRATE

FIELD OF THE INVENTION

Data storage mediums comprising a data storage film upon a substrate, the substrate characterized by optical inactivity, such as dichroism and birefringence, and high temperature stability up to 460° C, and being poly(parabanic acids).

BACKGROUND OF THE INVENTION

Poly(parabanic acids), PPA, is a new class of polymers developed by the Esso Research and Engineering Company, and is the subject of U.S. Pat. No. 3,661,859 entitled "Poly(1,3-Imidazolidine-2,4,5-Triones)" assigned to Esso. The material, more commonly known as PPA, is fully described in that patent, which is incorporated into this application for its teachings. This invention is directed not to the composition PPA, but to new uses of PPA based upon its high temperature stability and the discovery that the material is so optically inactive as to be especially useful in data storage applications, such as for beam addressable file uses. It may be made free of stress induced dichroism and birefringence. Thus, magneto-optic films in particular may be deposited upon PPA as a substrate, where reading occurs by utilizing the Kerr or Faraday effect. The optical inactivity permits higher signal-to-noise ratios than have heretofore been possible with polymer substrates, especially from polyethylene terephthalate.

SUMMARY OF THE INVENTION

Poly(parabanic acids) is used as a substrate for data storage films, particularly magneto-optic films, for the purpose of enhancing the signal-to-noise ratio in Kerr or Faraday readout modes by being an optically inactive medium having high temperature stability. This optical inactivity and temperature stability to 460° C also permit writing by localized heating into the film without affecting dimensional stability or readout capability.

GENERAL DESCRIPTION

Poly(parabanic acids) is a new class of thermally stable film forming polymers developed by the Esso Research and Engineering Company, as described in U.S. Pat. No. 3,661,859, cited earlier. The M-form is illustrated and has the structure:

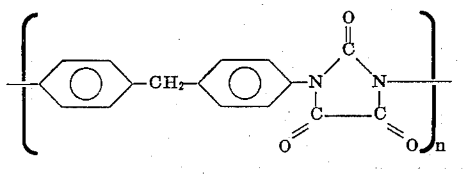

While all of the PPA polymers have shown significant properties when used as the substrate, particularly in tape form, to data storage applications, the M-form is the most temperature stable. All of the PPA polymers exhibit the unusual and unexpected optical inactivity.

The type of storage films with which this invention is concerned are those requiring one or more of the following properties in the underlying substrate: optical inactivity so as not to interfere with Kerr or Faraday readout; optical inactivity and temperature stability at elevated temperatures to 460° C, to permit high temperature film deposition upon the substrate; the ability to be made stress free, so as to avoid stress induced dichroism in the Kerr or Faraday readout mode; the ability to be thermally stable at localized heating to temperatures up to 460° C for localized heating type of writing applications. Typically, films such as MnGaGe, MnAlGe and MnBi are magneto-optic films suitable for deposition upon such a substrate. In these systems, deposition occurs in the vapor phase or by sputtering upon a substrate heated to for example, 100° C for MnGaGe, and followed by a MnGaGe crystallizing anneal at for example 275° C for 10 minutes. For MnBi, a 250° C anneal temperature is desirable.

Other films utilizable include amorphous semiconductor and amorphous magnetic type films. In these, an amorphous-crystalline, or crystalline-amorphous structure change occurs upon the application of heat. The structural state of the material is indicative of the information stored therein. Reading may occur by optical light transmission or reflection, which is affected by the presence or absence of the crystalline structure.

In the case of the MnGaGe film mentioned above, a polar Faraday rotation of $2\Theta_F = 9.1 \times 10^4$ deg/cm and $H_c = 3.6$ KO*e* was measured at room temperature, with a remanence of 90 percent. The substrate material may be in tape form, which is extremely useful. The common polymer tape substrate, polyethylene terephthalate, is very optically active when compared to PPA. While the PPA M-type is most preferred due to its high temperature stability to 460° C, other PPA forms have similar optical properties but different temperature stable ranges which may be chosen as desired for a given application.

Optical inactivity in a transparent high temperature high tensile strength flexible polymer is very desirable and has not been found before PPA. When plane polarized light is directed upon a magnetic material, the plane of polarization is rotated in relation to the magnetic characteristics of the material. In reflection, the determination of the rotation utilizes the Kerr effect; in transmission, a similar rotation occurs, and the Faraday effect is utilized. Ideally, the substrate will have no effect upon the degree of rotation. In practice, the substrate always has an effect contributing to noise. However, PPA has been discovered to be completely optically inactive, and if not stressed, but left in an annealed or as-cast condition, is free of stress induced dichroism or birefringence. Thus, it is particularly suitable for light-involving storage applications. Even in situations involving amorphous semiconductors using differing light transmission properties for reading as a function of the structural state, the optical inactivity of PPA allows improved signal-to-noise properties. In effect, of known polymer materials, PPA acts most like a perfect substrate and does not interfere with the reading process while affording unique high temperature stability.

Thus, the invention lies in the discovery of the suitable combination of optical and thermal properties of PPA for data storage applications when used as a substrate and having a data storage film thereon. Substantially amorphous unstressed polyparabanic acid is particularly useful in a data storage medium where information stored in a magnetic layer upon a substrate is read by the Kerr or Faraday magneto-optic effect, and the PPA is used for the purpose of minimizing the optical influence of the substrate upon the reading process. Further, the substrate is particularly useful in a data storage medium wherein information is stored in a storage layer upon a polymer substrate by the application of heat to a localized temperature of up to substantially 460° C to an area of the layer to affect at least one physical property of that area, such as an amorphous to crystalline or crystalline to amorphous transition, where the improvement for the purpose of offering higher temperature stability comprises using as the substrate substantially amorphous polyparabanic acid.

The material is also useful in the method of making a data storage medium by the method of depositing a storage layer upon a substrate maintained at a temperature of up to substantially 460° C during deposition or during subsequent heat treatment, where the improvement is for the purpose of the higher temperature stability while maintaining optical inactivity to achieve a substrate free of stress induced dichroism and birefringence, and comprises using PPA as a substrate. The substrate is preferably in tape form, but may be rigid or non-rigid in general, and may be disk shaped, drum shaped, or in small card shape for archieval storage, for example. Thus, this material proves to be extremely versatile having a wide range of data storage applications due to its unique optical inactivity. Other data storage uses utilizing the unique temperature stability and optical inactivity will become evident to those skilled in the art.

What is claimed is:

1. In a data storage medium wherein information stored in magnetic layer upon a substrate is read by the Kerr or Faraday magneto-optic effect, the improvement for the purpose of minimizing the optical influence of the substrate upon the reading process comprising using as the substrate substantially amorphous unstressed poly(parabanic acid).

2. The method of claim 1 wherein the substrate is in the form of a rigid medium.

3. The data storage medium of claim 1 wherein the substrate is in a non-rigid form.

4. The data storage medium of claim 1 wherein the substrate is in the form of tape.

5. The method of claim 1 wherein a substrate is in disk form..

6. In a data storage medium wherein information is stored in a storage layer upon a polymer substrate by the application of heat to a temperature of up to substantially 460° C to a localized area of the layer to affect at least one physical property of the area, the improvement for the purpose of higher temperature stability comprising using as the substrate substantially unstressed poly(parabanic acid).

7. The method of claim 6 wherein the substrate is in the form of a rigid medium.

8. The data storage medium of claim 6 wherein the substrate is in a non-rigid form.

9. The data storage medium of claim 6 wherein the substrate is in the form of tape.

10. The method of claim 6 wherein a substrate is in disk form.

11. In the method of making a data storage medium by the method of depositing a storage layer upon a substrate maintained at a temperature of up to substantially 460° C during deposition or during subsequent heat treatment, the improvement for the purpose of higher temperature stability while maintaining optical inactivity to achieve a substrate free of stress induced dichroism and birefringence comprising using as the substrate substantially amorphous polyparabanci acid.

12. The method of claim 11 wherein the substrate is in the form of a rigid medium.

13. The data storage medium of claim 11 wherein the substrate is in a non-rigid form.

14. The data storage medium of claim 11 wherein the substrate is in the form of tape.

15. The method of claim 11 wherein a substrate is in disk form.

* * * * *